US012211632B2

(12) United States Patent
Xu et al.

(10) Patent No.: US 12,211,632 B2
(45) Date of Patent: Jan. 28, 2025

(54) TMOV DEVICE

(71) Applicant: Dongguan Littelfuse Electronics Company Limited, Dongguan (CN)

(72) Inventors: Mingxi Xu, Dongguan (CN); Hiker Cai, Dongguan (CN)

(73) Assignee: Dongguan Littelfuse Electronics Company Limited, Dongguan (CN)

( * ) Notice: Subject to any disclaimer, the term of this patent is extended or adjusted under 35 U.S.C. 154(b) by 305 days.

(21) Appl. No.: 18/070,553

(22) Filed: Nov. 29, 2022

(65) Prior Publication Data

US 2023/0170113 A1 Jun. 1, 2023

(51) Int. Cl.

*H01C 7/112* (2006.01)
*H01C 7/102* (2006.01)
*H01C 17/26* (2006.01)

(52) U.S. Cl.

CPC ............. *H01C 7/112* (2013.01); *H01C 7/102* (2013.01); *H01C 17/265* (2013.01)

(58) Field of Classification Search

CPC .......... H01C 7/112; H01C 7/102; H01C 7/12; H01C 17/265

See application file for complete search history.

(56) References Cited

U.S. PATENT DOCUMENTS 3,743,897 A * 7/1973 Harnden, Jr. ........... H01L 23/62 338/21
6,636,403 B2 * 10/2003 McLoughlin .......... H01C 7/126 337/5
11,177,057 B2 * 11/2021 Liu ...................... H01C 17/281
2007/0200657 A1 * 8/2007 Tsai ....................... H01C 7/102 338/21
2008/0088404 A1 * 4/2008 Lu .......................... H01C 7/126 338/20
2008/0129440 A1 * 6/2008 Ho ........................... H01C 1/08 337/5
2018/0102640 A1 * 4/2018 Crevenat ................ H01H 83/10
2020/0001371 A1 * 1/2020 Nuida ..................... B22F 1/102
2020/0373112 A1 * 11/2020 Xu ......................... H01C 7/126

* cited by examiner

*Primary Examiner* — Kyung S Lee
(74) *Attorney, Agent, or Firm* — KDW Firm PLLC

(57) ABSTRACT

A thermally protected metal oxide varistor includes a body, a first electrode, a thermal fuse, and a glue. The body is made up of a crystalline microstructure including zinc oxide mixed with one or more other metal oxides. The first electrode is located on one side of the body and is connected to a first lead wire. The thermal fuse is connected between the first electrode and the first lead wire. The glue is to be deposited over the thermal fuse as well as over a top portion of the first lead wire.

16 Claims, 8 Drawing Sheets

300

100

100

300

300

300

300

TMOV DEVICE

FIELD OF THE DISCLOSURE

Embodiments of the present disclosure relate to metal oxide varistors (MOVs) and, more particularly, to MOV packaging.

BACKGROUND

Overvoltage protection devices are used to protect electronic circuits and components from damage due to overvoltage fault conditions. The overvoltage protection devices may include metal oxide varistors (MOVs), connected between the circuit to be protected and a ground line. Varistors are voltage dependent, nonlinear devices which have electrical characteristics like back-to-back Zener diodes. Varistors are composed primarily of zinc oxide with small additions of other metal oxides such as bismuth, cobalt, manganese, and others. A thermally protected MOV (TMOV) additionally includes an integrated thermally activated element, such as a fuse, that is designed to open in the event of overheating due to the abnormal overvoltage event.

MOVs, including TMOVs, are sintered during the manufacturing operation into a ceramic semiconductor and results in a crystalline microstructure that allows the MOV to dissipate very high levels of transient energy across the entire bulk of the device. Therefore, MOVs are typically used for the suppression of lightning and other high energy transients found in industrial or AC line applications. Additionally, MOVs are used in DC circuits such as low voltage power supplies and automobile applications. Their manufacturing process permits many different form factors with radial leaded discs being the most common.

The varistor body includes a matrix of conductive zinc oxide grains separated by grain boundaries, providing P-N junction semiconductor characteristics. These boundaries are responsible for blocking conduction at low voltages and are the source of the nonlinear electrical conduction at higher voltages. The symmetrical, sharp breakdown characteristics of the MOV enables it to provide excellent transient voltage suppression performance. When exposed to high voltage transients, the varistor impedance changes many orders of magnitude from a near open circuit to a highly conductive level, thus clamping the transient voltage to a safe level. The potentially destructive energy of the incoming transient pulse is absorbed by the MOV, thereby protecting vulnerable circuit components.

Component miniaturization has resulted in increased sensitivity to electrical stresses. Microprocessors, for example, have structures and conductive paths which are unable to handle high currents from electrostatic discharge (ESD) transients. Such components operate at very low voltages, so voltage disturbances must be controlled to prevent device interruption and latent or catastrophic failures. Sensitive devices such as microprocessors are being adopted at an exponential rate. In addition to being the heart of computers, microprocessors are increasingly used in home appliances, industrial controls, vehicles, and even toys. The current electronic/industrial applications utilize electronic components with smaller size and higher performance, making the product dimensions a critical factor for some applications. Further, because the MOVs are quite small, any changes in the MOV components can result in unintended behavior during manufacturing.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a thermally protected metal oxide varistor in accordance with the present disclosure may include a body, a first electrode, a thermal fuse, and a glue. The body is made up of a crystalline microstructure including zinc oxide mixed with one or more other metal oxides. The first electrode is located on one side of the body and is connected to a first lead wire. The thermal fuse is connected between the first electrode and the first lead wire. The glue is to be deposited over the thermal fuse as well as over a top portion of the first lead wire.

Another exemplary embodiment of a thermally protected metal oxide varistor in accordance with the present disclosure may include a first electrode, a body, a thermal fuse, and a glue. The first electrode is connected to a first lead wire. The body is adjacent the first electrode and includes a matrix of conductive zinc oxide grains separated by grain boundaries, providing P-N junction semiconductor characteristics, the grain boundaries to block conduction at low voltages and being the source of nonlinear electrical conduction at higher voltages. The thermal fuse, which is in series with the body, is connected between the first electrode and the first lead wire and breaks connection to the first lead wire when a sustained over-voltage condition occurs. The glue, which is to be deposited over the thermal fuse, prevents the thermal fuse from burning or carbonizing.

DETAILED DESCRIPTION

A thermally protected metal oxide varistor (TMOV) utilizes a 500 HF glue to ensure success of the TMOV during current limiting tests. The TMOV includes a thermal fuse connected to one of the electrodes and to one of the lead wires. The thermal fuse, which is in series with the MOV body, provides thermal protection in the case of sustained over-voltage occurrences by breaking and forming an open circuit. The 500 HF glue, deposited over the thermal fuse as well as its connection points, prevents the MOV from burning or carbonization during the current limiting tests.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components described herein, whether appearing in the perspective, exploded perspective, and cross-sectional views. Said terminology is not intended to be limiting and includes the words specifically mentioned, derivatives therein, and words of similar import.

Figure 1A:
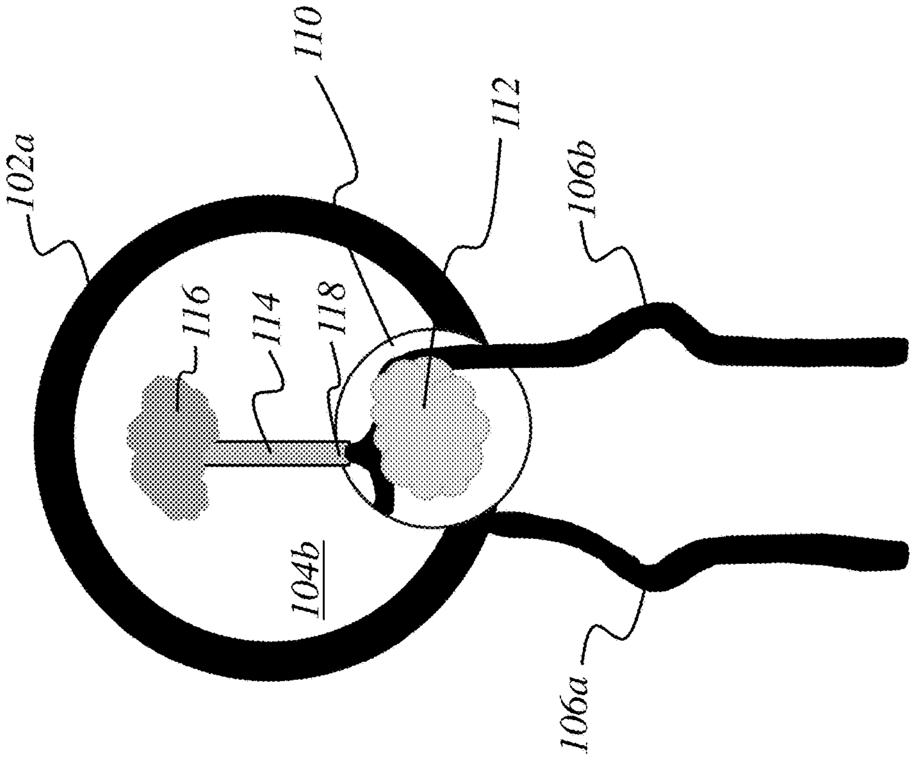
FIG. 1A (prior art)
FIGS. 1A-1C are diagrams illustrating a thermally protected metal oxide varistor, in accordance with the prior art.
Figure 1B:
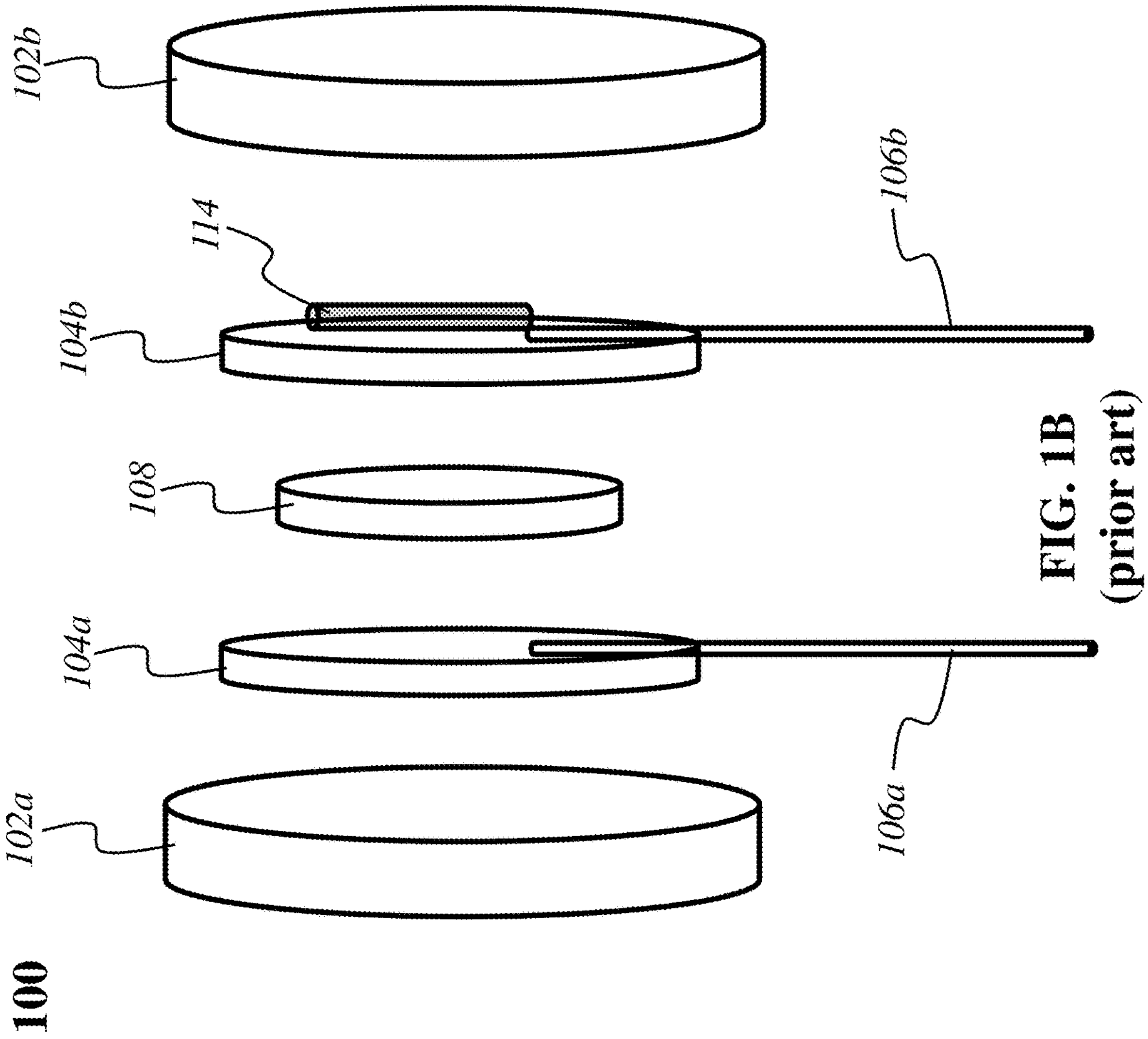
FIG. 1B (prior art)
Figure 1C:
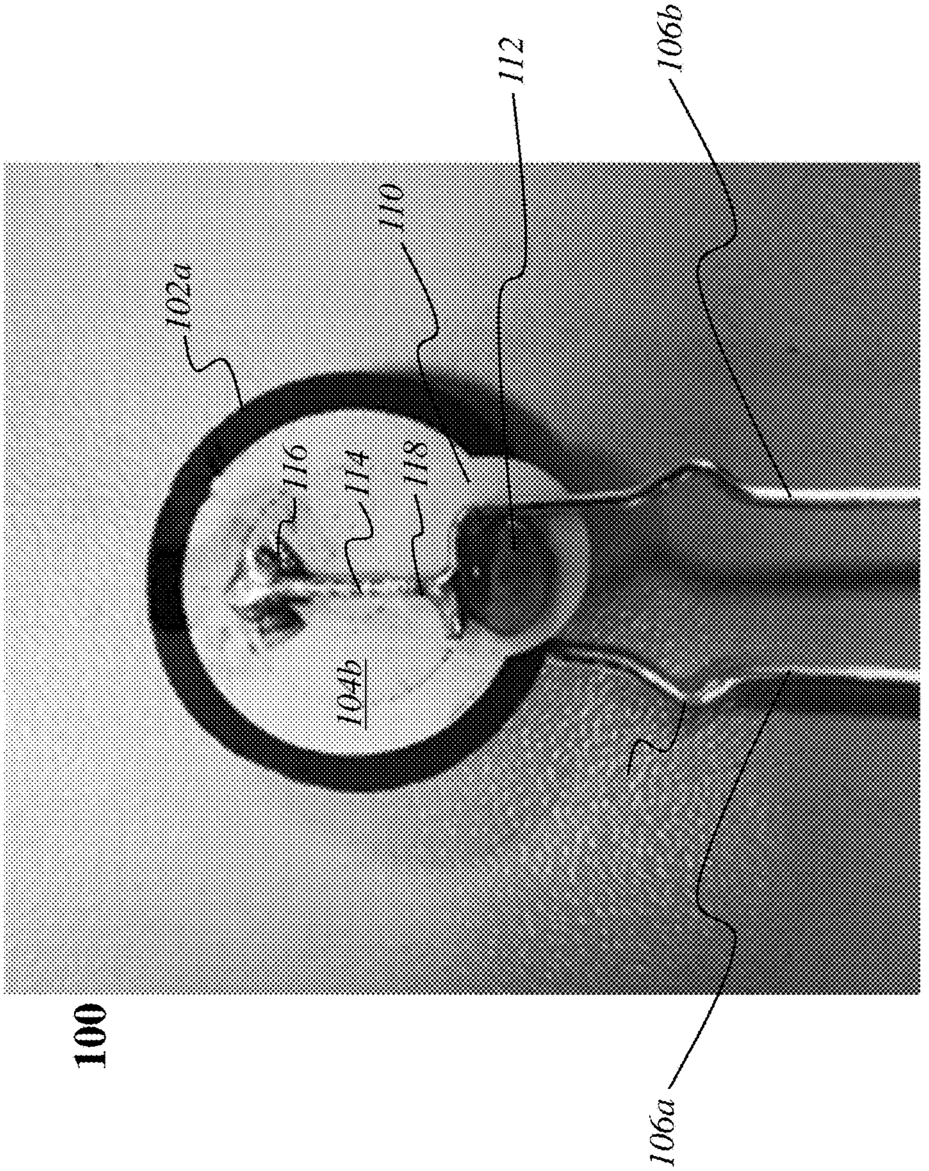
FIG. 1C (prior art)

FIGS. 1A-1C are representative drawings of a thermally protected metal oxide varistor (TMOV) 100 for providing overvoltage protection, according to the prior art. FIG. 1A is a plan view, FIG. 1B is an exploded perspective view, and FIG. 1C is a photographic view of the TMOV 100. The TMOV 100 is an example of a radial leaded disc type of MOV. The TMOV 100 includes a first ceramic resistor 102*a* and a second ceramic resistor 102*b* (FIG. 1B) (collectively, "ceramic resistor(s) 102"). The two ceramic resistors 102 surround and contain the other components of the TMOV 100. Looking particularly at FIG. 1B, the ceramic resistors 102 house two electrodes 104*a* and 104*b* (collectively, "electrode(s) 104") with a MOV body 108 sandwiched between the two electrodes. The MOV body 108 is a crystalline microstructure featuring zinc oxide mixed with one or more other metal oxides that allows the TMOV 100 to dissipate high levels of transient energy across the bulk of the device. Put another way, the MOV body 108 has a matrix of conductive zinc oxide grains separated by grain boundaries, providing P-N junction semiconductor characteristics, with the boundaries blocking conduction at low voltages and being the source of the nonlinear electrical conduction at higher voltages. Both sides of the ceramic resistor 102 are to be covered in an encapsulant, such as epoxy (not shown). The epoxy may be a liquid crystal polymer (LCP) or polyphenylene sulfide (PPS), as two examples.

An electrode 104*b* is visible in FIGS. 1A and 1C, while electrode 104*a* is shown in FIG. 1B. In FIGS. 1A and 1C, the ceramic resistor 102*b* is not shown, and the MOV body 108 is visible in the exploded view of FIG. 1B. The electrode 104*a* is affixed to ceramic resistor 102*a* while electrode 104*b* is affixed to ceramic resistor 102*b*, with the MOV body 108 being disposed therebetween. In the example of FIGS. 1A-1C, the ceramic resistors 102, the electrodes 104, and the MOV body 108 are each substantially circular disc-shaped, with the ceramic resistors having a slightly larger radius than the electrodes, though each of these components may be formed in non-circular shapes. The radial edge of ceramic resistor 102*a* is visible "behind" the electrode 104*b* in FIGS. 1A and 1C.

The TMOV 100 features lead wires extending radially outward from the ceramic resistor 102*a*, one of which is fully visible while the other is partially obscured. A first lead wire 106*a* extends downward on one side of the ceramic resistor 102*a*. A second lead wire 106*b* extends downward on the other side of the ceramic resistor 102*a* (collectively, "lead wire(s) 106"). As shown in the exploded view (FIG. 1B), the lead wire 106*a* is connected to the electrode 104*a* while the lead wire 106*b* is connected to the electrode 104*b*. The lead wires 106 are made from an electrically conductive material, such as copper, and may be tin plated.

The lead wire 106*b* is also connected to one side of a thermal fuse 114, at a thermal link 118, while the other side of the thermal fuse is connected to the electrode 104*b* at a soldering joint 116. The electrode 104*b* may also be referred to as fused electrode 104*b*. The thermal fuse 114 is electrically connected in series to the MOV body 108. While the MOV body 108 enables the TMOV 100 to operate as a surge suppressor, the thermal fuse 114 provides integrated thermal protection which open-circuits the TMOV in the event of overheating due to sustained overvoltages. During normal operation, a current flowing through the TMOV 100 travels from the lead wire 106*b*, through the thermal fuse 114, through the electrode 104*b*, to the MOV body 108, to the electrode 104*a*, and finally to the lead wire 106*a*, and vice-versa.

An alumina oxide sheet 110 made up of alumina flakes is disposed beneath the lead wire 106*b* and above the electrode 104*b*. A hot melt glue 112 is deposited over the alumina oxide sheet 110 to fix the alumina oxide sheet in place. The hot melt glue 112 may be any material which is an electrical insulator, and which becomes molten at approximately the fusing temperature. The thermal fuse 114 is connected to the electrode 104*b* by a soldering joint 116. During sustained over-voltage conditions, the soldering joint 116, the thermal fuse 114, and the hot melt glue 112 becoming molten and break connection to the lead wire 106*b*, resulting in an open circuit within the TMOV 100. The disconnection of the thermal fuse 114 from the soldering joint 116 is known as "bounce", and the bounce results in an open circuit. In this way, the TMOV 100 provides thermal protection that is not found in MOVs that lack thermal fuses.

The exploded view in FIG. 1B is somewhat exaggerated, as the electrodes 104 of the TMOV 100 are usually quite thin sheets of electrically conductive material. Different materials can be used to make the electrodes 104, such as silver, copper, aluminum, nickel, or combinations of these materials. However, these electrically conductive materials have different properties, such as their melting points. Silver, for example, has a lower melting point than copper.

When the electrodes are made using a combination of copper and aluminum, rather than silver, as one example, the TMOV may not experience the bounce that results in an open circuit. Empirical testing performed on the TMOV having copper-aluminum electrodes, for example, has shown that, while the thermal fuse is blown, the bounce that disconnects the thermal fuse from the soldering joint does not occur. Thus causes the TMOV to burn and even carbonize.

Figure 2:
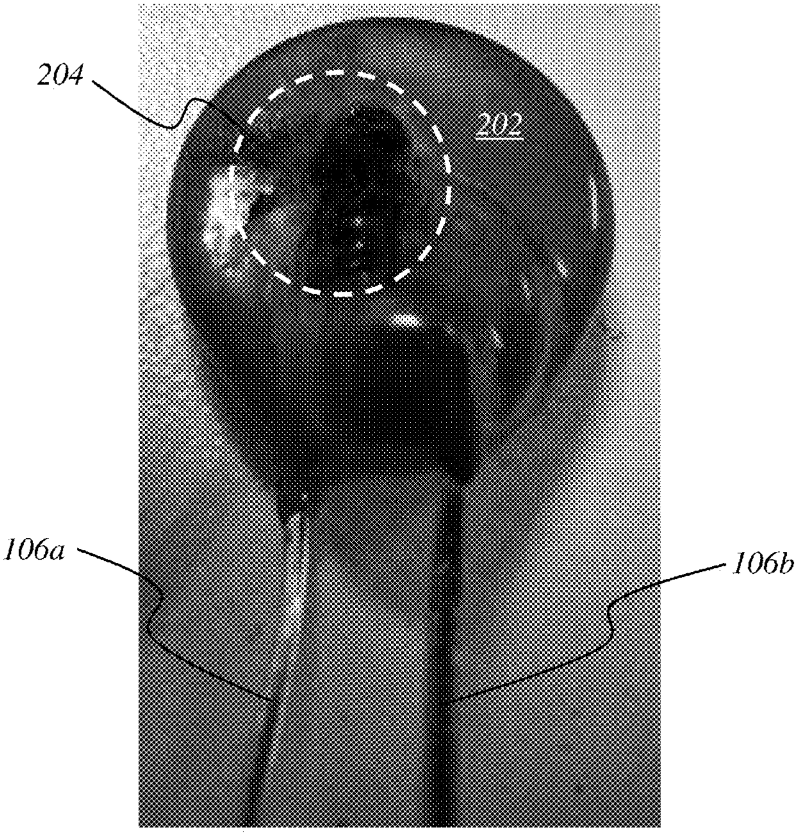
FIG. 2 (prior art)
FIG. 2 is a diagram illustrating the thermally protected metal oxide varistor of FIGS. 1A-1C, in accordance with the prior art.

FIG. 2 is a representative drawing of the TMOV 100 following a current limit test, according to the prior art. The TMOV 100 includes copper-aluminum electrodes. The TMOV 100 is covered with an epoxy coating 202 to encapsulate the components shown in FIGS. 1A-1C.

The current limit test is one in which the TMOV 100 is stressed by currents that are higher than currents for which the TMOV is designed as well as a voltage level above a certain threshold (e.g., 550 V) to test how the device will respond to excessive heat. Put another way, the current limit test is designed to ensure that the thermal fuse will break, causing an open circuit within the TMOV. Thus, the current limit test is designed to cause the TMOV 100 to fail due to the bounce of the thermal fuse from its soldering joint. Following the current limit test, however, the TMOV 100 should not burn or carbonize.

A dotted circle 204 indicates where the TMOV 100 has burned/carbonized. The thermal fuse inside may have blown, but the low-temperature solder joint 116 fails to bounce, causing the TMOV to burn or even carbonize. As another possibility, the lead wire 106*b*, connected to the thermal fuse 114 inside, may have hit the adjacent ceramic resistor 102*b*. In either case, the TMOV 100 may not be an open circuit, which is a failure that would endanger a circuit to which the TMOV is connected.

Figure 3A:
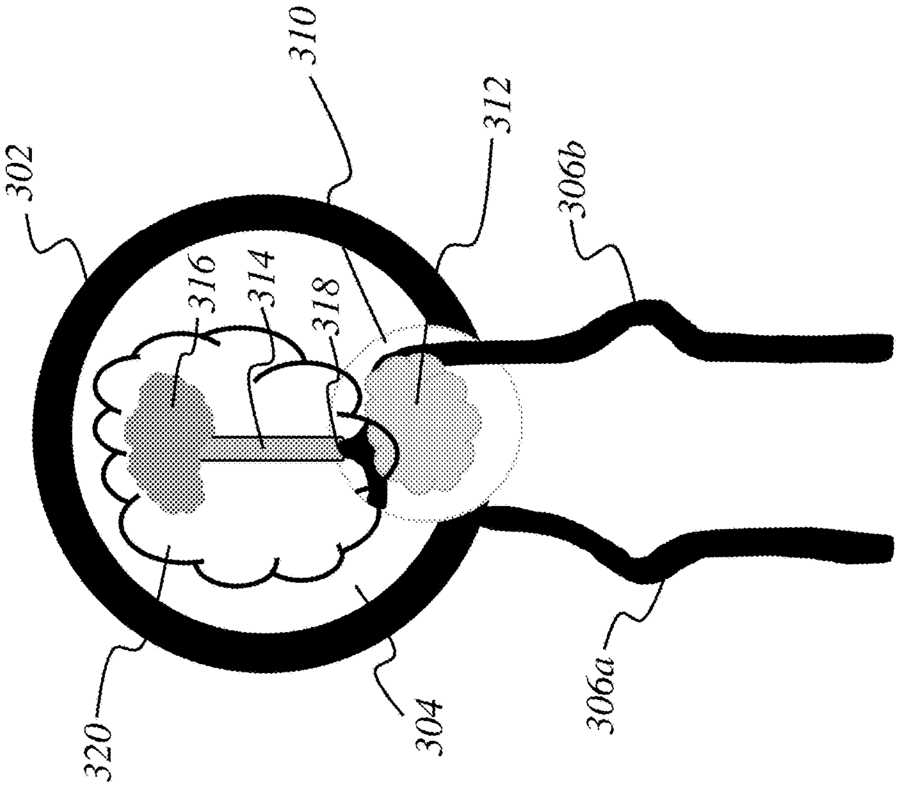
FIGS. 3A-3C are diagrams illustrating a thermally protected metal oxide varistor, in accordance with exemplary embodiments.
Figure 3B:
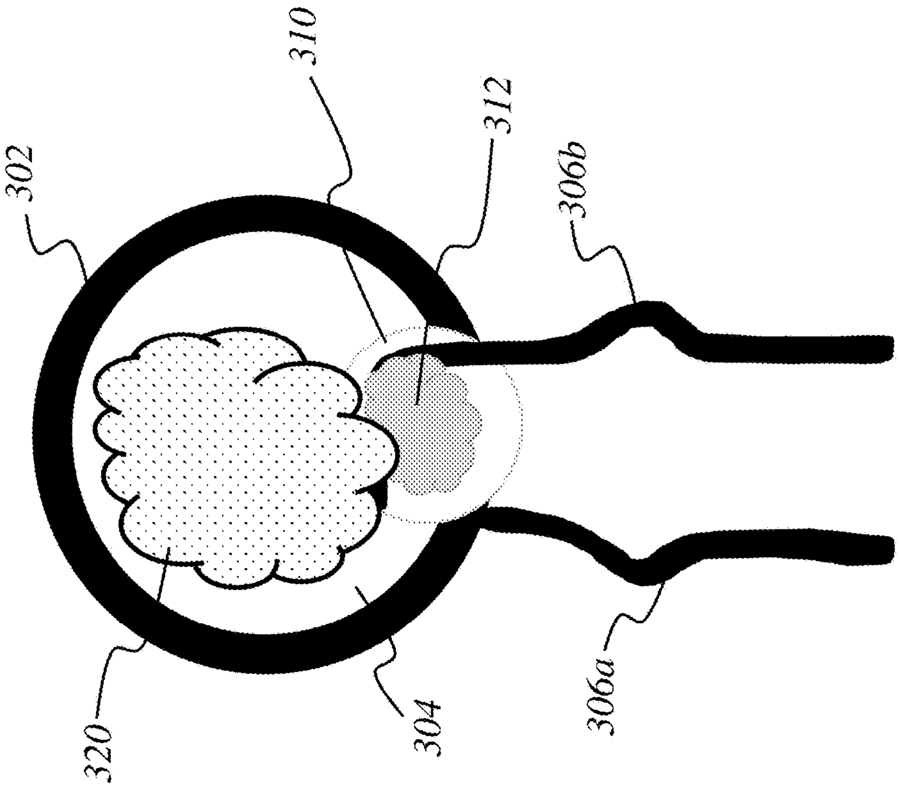
Figure 3C:
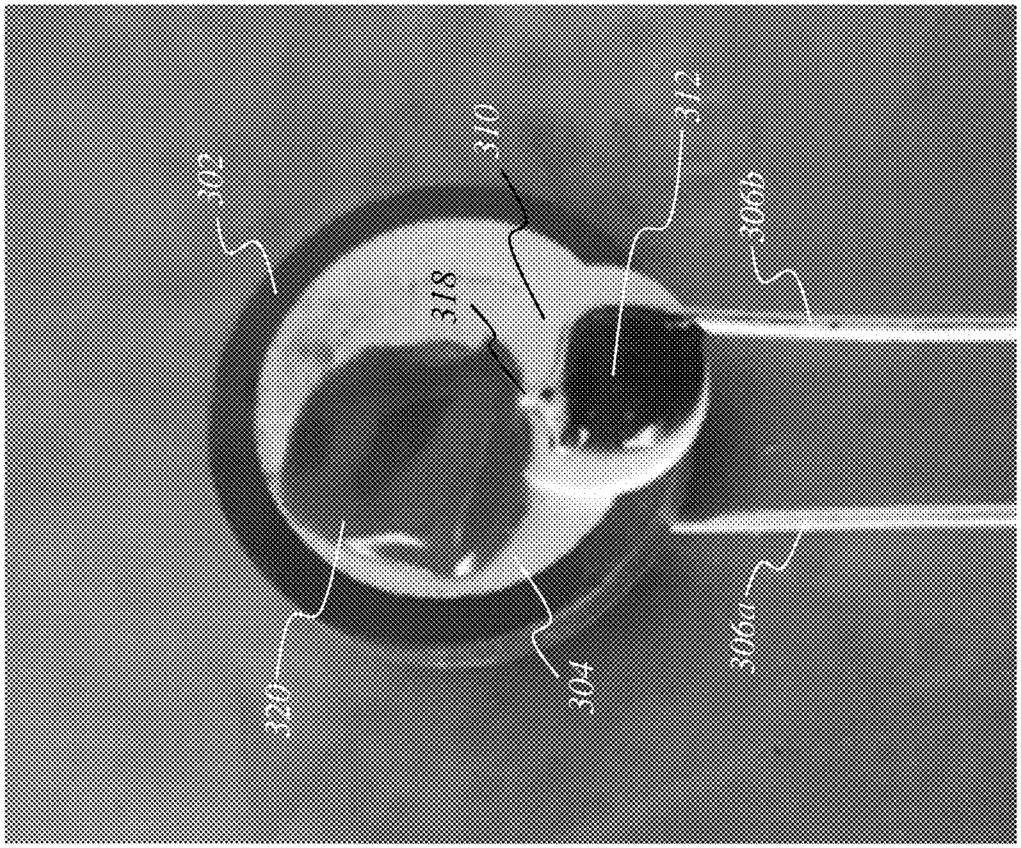

FIGS. 3A-3C are representative drawings of a TMOV 300, according to exemplary embodiments. FIGS. 3A and 3B are plan views and FIG. 3C is a photographic image of the TMOV 300. The TMOV 300 includes a ceramic resistor 302 and a second ceramic resistor (not shown), with the two ceramic resistors surrounding and containing the other components of the TMOV 300. An electrode 304 is disposed adjacent the ceramic resistor 302. Along with a second electrode (not shown), the electrodes surround a MOV body (not shown), with the MOV body being like the MOV body 108 in the TMOV 100. As with the TMOV 100, the TMOV 300 is to be covered in an encapsulant, such as epoxy (not shown), which may be LCP, PPS, or some other material.

The TMOV 300 features lead wires extending outward from the ceramic resistor 302, one of which is fully visible while the other is partially obscured. A first lead wire **306*a* extends downward on one side of the ceramic resistor 302. A second lead wire 306*b* extends downward on the other side of the ceramic resistor 302 (collectively, "lead wire(s) 306"). The lead wire 306*b* is connected to the electrode 304 while the lead wire 306*a*** is connected to the other (not visible) electrode.

The lead wire **306*b* is also connected to one side of a thermal fuse 314, at a fuse thermal link 318, while the other side of the thermal fuse is connected to the electrode 304 at a soldering joint 316. The electrode 304 may also be referred to as fused electrode 304. The thermal fuse 314 is electrically connected in series to the MOV body (not shown). As with the TMOV 100, the MOV body enables the TMOV 300 to operate as a surge suppressor while the thermal fuse 314** provides integrated thermal protection which open-circuits the TMOV in the event of overheating due to sustained overvoltages.

An alumina oxide sheet 310 is disposed beneath the lead wire **306*b* and above the electrode 304. A hot melt glue 312 is deposited over the alumina oxide sheet 310. The thermal fuse 314 is connected to the electrode 304 by a soldering joint 316. Further, in exemplary embodiments, the thermal fuse 314, the soldering joint 316, the fuse thermal link 318, a top portion of the alumina oxide sheet 310, and a top portion of the lead wire 306*b* are covered with a glue 320. In FIG. 3A, the glue 320 is transparent, revealing the underlying components while in FIG. 3B, the glue is opaque (indicated with dots). The photographic image of FIG. 3C show that the glue 320 is somewhat amorphous in shape but covers the above-described elements of the TMOV 300**.

During sustained over-voltage conditions, the soldering joint 316, the thermal fuse 314, and the hot melt glue 312 becoming molten and break connection to the lead wire **306*b*, resulting in an open circuit within the TMOV 300. In contrast to the TMOV 100 shown in FIG. 2, however, the glue 320 prevents the TMOV from burning or carbonizing. Even if the low-temperature solder joint 316 fails to bounce, in exemplary embodiments, the glue 320 prevents the condition from burning or carbonizing the TMOV 300. Further, in exemplary embodiments, the glue 320 prevents the lead wire 306*b* from hitting the electrode 304, thus ensuring the desired open circuit condition following the disconnection of the thermal fuse 314**.

In exemplary embodiments, the glue 320 is a 500 HF glue, and acts as an insulating material to protect the TMOV 300. In exemplary embodiments, after welding the lead wires to the ceramic resistors, the glue 320 is applied as shown in FIGS. 3A-3C. In some embodiments, a hot air gun is then used to blow the glue 320 to fill any gaps between components, particularly to ensure that the thermal fuse 314 does not touch either of the ceramic resistors. In exemplary embodiments, the 500 HF glue is packaged in a syringe-type packaging such that the glue 320 can be deposited with precision on the TMOV 300. The syringe of the glue 320 can be thus used to precisely cover the thermal fuse 314, the low-temperature solder joint 316, and fuse thermal link 318, ensuring that the glue 320 fills any gaps between the solder joint, the fuse thermal link, and the alumina oxide sheet 110.

Figure 4:
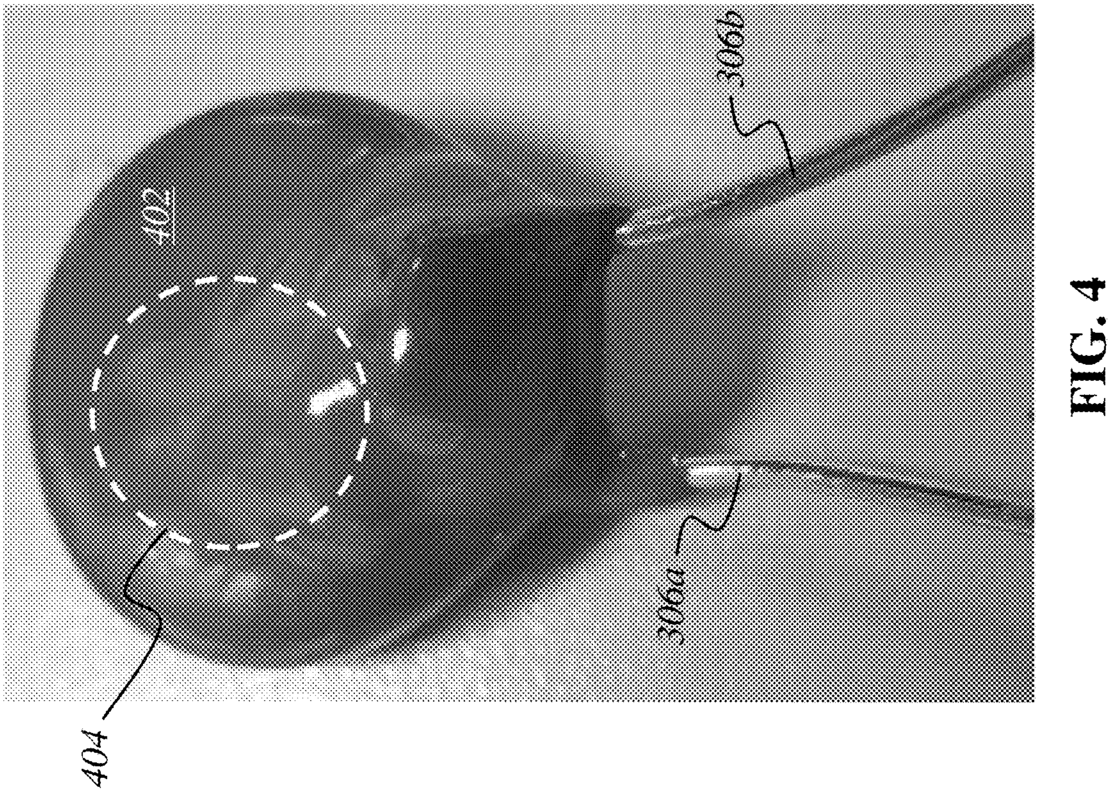
FIG. 4 is a diagram illustrating the thermally protected metal oxide varistor of FIGS. 3A-3C, in accordance with exemplary embodiments.

FIG. 4 is a representative drawing of the TMOV 300 following a current limiting test, according to exemplary embodiments. The TMOV 300 is covered with an epoxy material 402, which obscures the components inside. The glue 320, as illustrated in FIGS. 3A and 3B and described above, is used to cover the thermal fuse 314, the soldering joint 316, the fuse thermal link 318, a top portion of the alumina oxide sheet 310, and a top portion of the lead wire **306*b*. A circle 404 shows that, following a current limiting test, no burning or carbonization of the TMOV 300 occurred. In exemplary embodiments, when subjected to the current limiting test, the TMOV 300 the low-temperature solder joint 316 does not bounce off the glue 320, ensuring that the TMOV does not burn or become carbonized. In some embodiments, the glue 320 is then cured by blowing air at a temperature of 130° C. before the TMOV 300** is encapsulated with epoxy.

In exemplary embodiments, the addition of the 500 HF glue effectively reduces the failure ratio of TMOV devices in current limiting tests. The addition of the glue 320 to the TMOV 300 essentially wraps the thermal fuse 314, which ensures that, once the thermal fuse opens in response to the anomalous condition, the thermal fuse and the adjacent components will not hit the electrode 304 when the open circuit occurs. Further, in exemplary embodiments, the 500 HF glue effectively deals with a full range of TMOV current limit tests. The TMOV 300 can effectively improve the TMOV voltage level of about 550V to mitigate the burning and carbonization phenomenon. Additionally, the TMOV 300 provides a high degree of safety in the manufacturing environment and demonstrates improved product performance over the prior art TMOV 100, in some embodiments. Empirical studies conducted of the TMOV 300 showed a reduction in the failure rate of the current limit test from 30% to about 5%, in some embodiments.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A thermally protected metal oxide varistor comprising:

a body comprising a crystalline microstructure including zinc oxide mixed with one or more other metal oxides;

a first electrode disposed on a first side of the body, wherein the first electrode is connected to a first lead wire;

a second electrode disposed on a second side of the body, wherein the body is sandwiched between the first electrode and the second electrode, and wherein the second electrode is connected to a second lead wire;

a thermal fuse connected between the first electrode and the first lead wire;

a glue to be deposited over the thermal fuse and a top portion of the first lead wire; and a fuse thermal link connecting the thermal fuse to the first lead wire, wherein the glue covers the fuse thermal link.

2. The thermally protected metal oxide varistor of claim 1, further comprising an alumina oxide sheet disposed between the first electrode and the first lead wire, wherein the glue is to cover a portion of the alumina oxide sheet.

3. The thermally protected metal oxide varistor of claim 1, wherein the glue is cured by blowing air at a temperature of 130° C. thereon.

4. The thermally protected metal oxide varistor of claim 3, further comprising encapsulating the body, the first electrode, the second electrode, the thermal fuse, and the glue with an epoxy.

5. The thermally protected metal oxide varistor of claim 4, wherein the epoxy is a liquid crystal polymer.

6. The thermally protected metal oxide varistor of claim 4, wherein the epoxy is a polyphenylene sulfide.

7. A thermally protected metal oxide varistor comprising:

a first electrode coupled to a first lead wire;

a body disposed adjacent the first electrode, the body comprising a matrix of conductive zinc oxide grains separated by grain boundaries, providing P-N junction semiconductor characteristics;

a thermal fuse connected between the first electrode and the first lead wire, the thermal fuse to be in series with the body, wherein the thermal fuse breaks connection to the first lead wire in response to a sustained over-voltage condition; and a glue to be deposited over the thermal fuse, the glue to prevent the thermal fuse from burning and/or carbonizing.

8. The thermally protected metal oxide varistor of claim 7, wherein the grain boundaries:

block conduction at a first voltage; and are the source of nonlinear electrical conduction at a second voltage;

wherein the first voltage is lower than the second voltage.

9. The thermally protected metal oxide varistor of claim 7, further comprising a second electrode disposed on a second side of the body, wherein the body is sandwiched between the first electrode and the second electrode.

10. The thermally protected metal oxide varistor of claim 9, wherein the second electrode is to connect to a second lead wire.

11. The thermally protected metal oxide varistor of claim 9, further comprising a soldering joint to connect the thermal fuse to the first electrode.

12. The thermally protected metal oxide varistor of claim 11, further comprising a fuse thermal link to connect the thermal fuse to the first lead wire.

13. The thermally protected metal oxide varistor of claim 12, further comprising an alumina oxide sheet disposed between the first electrode and the first lead wire.

14. The thermally protected metal oxide varistor of claim 13, wherein the glue covers the soldering joint, the fuse thermal link, and a top portion of the alumina oxide sheet.

15. The thermally protected metal oxide varistor of claim 14, further comprising curing the glue by blowing air at a temperature of 130° C. thereon.

16. The thermally protected metal oxide varistor of claim 15, wherein the thermal fuse does not touch a ceramic resistor following the curing.

* * * * *